INVENTOR.
DONOVAN CHESTER DAVIS
BY William T. O'Neil
AGENT.

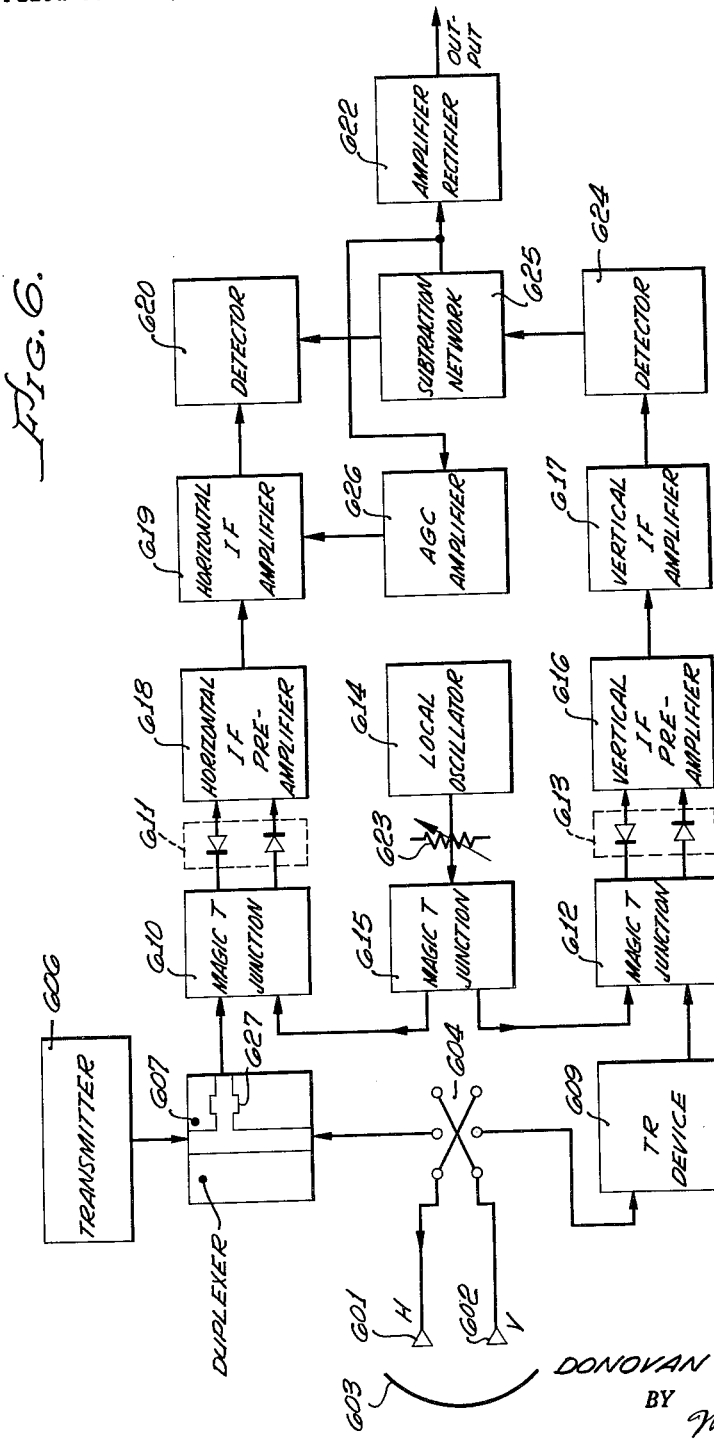

United States Patent Office 3,049,703
Patented Aug. 14, 1962

3,049,703
DUAL POLARIZATION SIGNAL CANCELLATION SYSTEM
Donovan Chester Davis, Pasadena, Calif., assignor to Gilfillan Bros. Inc., Los Angeles, Calif., a corporation of California
Filed Oct. 12, 1959, Ser. No. 846,030
15 Claims. (Cl. 343—5)

This invention relates generally to radiant energy receiving apparatus in radar systems and particularly to apparatus for the reduction of the sensitivity of radar or radio receiving equipment to either intentional or unintentional interference from modulated continuous waves or high duty cycle pulse modulated signals. The unique system of the present invention is based on the polarization characteristics of a signal, substantially without regard to antenna directivity pattern and is therefore capable of providing discrimination against interference from signals received either on the main lobe of a directive receiving antenna or on the side lobe of said antenna.

The invention is particularly useful in the field of relatively high radio-frequencies, such as are typically used in radar systems. For that reason, the invention will be described primarily as it pertains to that field of use, but without thereby implying any limitation upon its scope.

Basically, the present invention employs a "dual polarization" technique, utilizing a difference between the polarization of a desired signal and an interfering signal in conjunction with the duty cycle difference between the desired and undesired signals. In cases where a well defined difference between the duty cycle of the desired and undesired signal does not exist, a difference between desired and undesired signals in rate of polarization variation is useful as a distinguishing characteristic in lieu of a substantial difference in duty cycle.

Interfering signals in general can be placed in one of two categories, intentional and unintentional. Of these two the unintentional type, due mostly to the crowded conditions of the radio frequency spectrum, is generally more easily coped with. Sometimes, however, either type interfering signal, the source of which is unknown or not subject to control at the time, can be a serious problem even to the extent of completely blanketing the proximate RF spectrum in which the desired signal is being received. In such circumstances, the present invention with its ability to discriminate against interference can make it possible to receive a desired RF transmission under interference conditions which would otherwise prevent reception. Intentional interference is a problem generally most difficult to handle. Under certain military circumstances, means of minimizing the effects of such intentional interference (or jamming) is of the utmost importance, especially in the microwave region in which surveillance and tracking radars operate. In the microwave region, special type of unintentional interference must also be considered, to wit, reflection from hydrometeoric phenomena. Hydrometeors present in the atmosphere can cause considerable "clutter" in the signal output of a tracking or surveillance radar system. Rain interference in the microwave region can be of such intensity that the tracking of an aircraft or for that matter, any object becomes impossible.

It is, therefore, an object of the present invention to provide a radio frequency receiving system capable of a high degree of discrimination against interfering signals.

It is another object of the present invention to provide a radiant energy receiving system capable of discriminating against high duty cycle interfering energy in favor of lower duty cycle desired signals.

Still further, it is an object of the present invention to provide a system for receiving radiant energy signals which is capable of recognizing rates of change in polarization of incident signals and discriminating against signals of a given order of rate of polarization change in favor of signals exhibiting a different order of polarization change rate.

It is also an object of the present invention to provide a radar transmitting and receiving system adapted to discriminate against interfering received signals of higher duty cycle or a slower rate of polarization change than exhibited by reflections from transmitted energy.

It is yet another object of the present invention to provide a receiving system capable of a high degree of discrimination against hydrometeoric reflections.

In describing the present invention, drawings are submitted briefly described as follows:

FIG. 6 is a block diagram of a microwave transmit-receive system employing the dual polarization system in an embodiment differing somewhat from that of FIG. 1.

The basic concept relative to the dual polarization technique of the present invention envisions a system consisting of two receiver channels having gain and bandwidth characteristics determined by the intended receiver application. The input of each receiver channel connects to the terminal of an antenna. The two antennas are arranged to have substantially vertical polarization on one antenna and linear horizontal polarization on the other. It is not necessary that vertical and horizontal polarization be employed, any arbitrary pair of (preferably mutually orthogonal) planes of polarization being capable of satisfying the minimum basic requirements of the invention in this respect. In the case of antennas employing reflectors as in many radar systems, the two antennas need not be physically separate, but may rely on a single reflector fed by two orthogonally polarized feeds or a single feed from which orthogonally polarized signals can be independently coupled. After detection (demodulation) the outputs of the two receiver channels are differenced (subtracted) and the difference signal amplified in a video or audio amplifier.

Since a dual polarization system according to the present invention utilizes polarization differences to achieve interfering signal rejection, the nature of the polarization of both the desired signal and the undesired interfering signal are of fundamental importance.

Since the reflection of incident waves without change of polarization occurs only from objects with very simple geometric shapes, the majority of reflected waves may be expected to exhibit some degree of signal depolarization. The reflection of incident waves from moving targets such as aircraft, are usually considerably depolarized, particularly when incident waves strike at aspect angles where many non-symmetrical surfaces contribute to the reflected wave. A typical aircraft, considering its contours and the comparatively rapid changes of aspect presented to an incident wave may thus be considered to be a source of depolarized reflected energy. Moreover, the change or "flutter" of polarization of the reflected energy may be sufficiently rapid that appreciable change in the predominate plane of polarization of reflected energy may occur during the time a radar scanner rotating at a rate on the order of 400 or 500 degrees per second is "illuminating" the target on any given revolution of said scanner.

Figure 1:
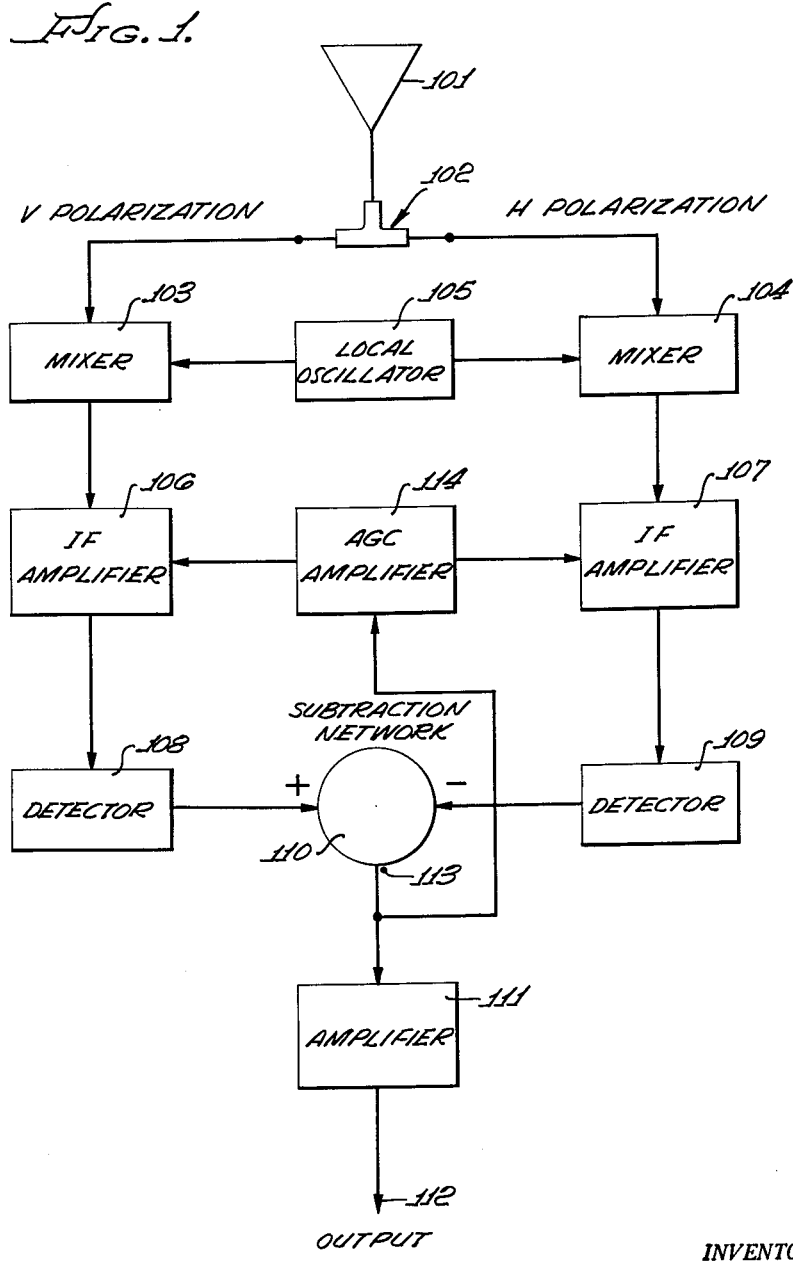
FIG. 1 is a simple block diagram of an embodiment of the dual polarization receiving system of the present invention.

FIG. 1 shows a block diagram of an embodiment of the dual polarization receiving system in which gain control is applied in both receiver channels. The antenna 101 may be any one of the known types designed to be sensitive to all polarizations. For example, a single symmetrical parabolic dish fed at its focus by a square or circular waveguide and horn constitutes a simple suitable all polarization antenna arrangement. The received radio frequency (RF) signal is resolved into two mutually orthogonal planes of polarization, as for example into horizontal and vertical components at signal divider 102, which in the microwave frequency realm could be a waveguide part originating from circular waveguide and having rectangular waveguide outputs, one for each of the two orthogonal polarizations. Volume 9 of the Radiation Laboratory Series (Ridenour, McGraw-Hill, 1948) describes and illustrates a suitable device for signal divider 102 on page 369, FIG. 6.58. The individual signal components thus obtained, are applied to duplicate superheterodyne type receiver channels comprising mixer 103, IF amplifier 106 and detector 108 in the one channel and mixer 104, IF amplifier 107, and detector 109 in the other.

In FIG. 1, mixers 103 and 104 operate in conjunction with local oscillator 105. The sum and difference signal (at IF frequency) from mixer 103 is fed to IF amplifier 106 and the IF signal output of mixer 104 is fed to IF amplifier 107. The outputs of IF amplifiers 106 and 107 are fed to video detectors 108 and 109 respectively, and after detection the video outputs are fed to difference network 110 and the resultant difference signal is then sent to amplifier 111, the output of which is the system output signal (output 112).

The average D.C. level of the difference signal at the difference output 113 is also used to provide an automatic gain control signal to IF amplifiers 106 and 107 to adjust the relative gains of the channels to achieve cancellation (zero remainder) at the difference output 113. This is accomplished by feeding the difference output 113 to the AGC (automatic gain controlled) amplifier 114, the outputs of which differentially control the gains of the said IF amplifiers 106 and 107. Ordinary AGC circuitry may be expected to suffice, except that one direct and one inverted AGC voltage both proportional to average difference signal are required to implement the differential control of the two receiver channels (i.e., the gain control is applied differentially to the two receiver channels so that while one is increasing the other is decreasing). If the response time of AGC amplifier 114 is designed to be such that appropriate gain control signals are generated with an averaging or integrating action able to change slowly, compared to the interpulse period of any input signal, then the relative gains of the two IF amplifiers 106 and 107 are automatically adjusted to have the effect of rotating the effective plane of polarization to which the overall system is sensitive orthogonally with respect to and primarily in response to the predominating signal.

The overall effect (to be described in greater detail later on in this specification) of this scheme is thus to electronically adjust the effective plane of polarization to appear orthogonal, or approximately so, to the undesired signal. Thus, for example, a CW (continuous wave) interfering signal will be the predominating signal and will be greatly reduced by the cancellation process while the return pulsed signal from a radar transmitter will be relatively unaffected, provided it has a plane of polarization significantly different from that of the interfering signal.

It should be noted that since the differencing is accomplished after detection, the relative phase of the RF signals in each channel is unimportant. Moreover, for the same reason elliptically polarized signals are equivalent to some plane of linear polarization and circular polarization is equivalent to linear 45 degree polarization.

The degree of improvement (i.e., the extent to which the ratio of the desired signal to the undesired signal is modified through the system of the present invention) is a function of the relative polarizations of these two signals, the orthogonality of the two antennas or feeds and the match of the frequency responses and time delays in the two receiver channels up to the point of differencing. The mathematical relationship of the various factors is analyzed in the following derivation of performance and shown in FIG. 2 for a particular set of representative parameter values.

Let $S$ = signal voltage at antenna terminals with a polarization angle of $\phi$ relative to the polarization of the desired signal.

$J$ = interfering signal voltage at antenna terminals with a polarization angle of $\theta$ relative to the polarization of the desired signal.

$R_c$ = cross-coupling between the two receiver inputs due to the antenna system.

$C$ = cancellation ratio of difference circuit as limited by the AGC and receiver imperfections.

$\alpha$ = ratio of receiver channel gains to achieve cancellation.

If the two orthogonal effective antenna polarizations employed are assumed to be vertical and horizontal, and the desired signal polarization is assumed to be horizontal, the vertical and horizontal desired signal and undesired components are:

$$S_h = S \cos \phi$$
$$J_h = J \cos \theta \qquad (1)$$

$$S_v = S \sin \phi$$
$$J_v = J \sin \theta \qquad (2)$$

The gains of the two receiver channels are adjusted by the AGC circuitry such that at the receiver output $J_h + R_c J_v = J_v + R_c J_h$, or more precisely, $$\Delta J = |J_h + R_c J_v| - \alpha |J_v + R_c J_h| \qquad (3)$$
$$= C|J_h + R_c J_v| \qquad (4)$$

then $$C = \frac{|J_h + R_c J_v| - \alpha |J_v + R_c J_h|}{|J_h + R_c J_v|} \qquad (5)$$

$$= 1 - \alpha \left| \frac{\sin \theta + R_c \cos \theta}{\cos \theta + R_c \sin \theta} \right| \qquad (6)$$

and $$\alpha = (1 - C) \left| \frac{\cos \theta + R_c \sin \theta}{\sin \theta + R_c \cos \theta} \right| \qquad (7)$$

The RF phase relations between the various signals and their cross-coupled components can be accounted for by considering $R_c$ to be a complex number with a phase angle equal to the sum of the phase shift due to cross-coupling and the RF phase difference between the horizontal and vertical components:

The desired signal $S$ after cancellation is:

$$\Delta S = |S_h + R_c S_v| - \alpha |S_v + R_c S_h| \qquad (8)$$

The ratio of signal after cancellation to that before cancellation is:

$$\frac{\Delta S}{|S_h + R_c S_v|} = \frac{|\cos \phi + R_c \sin \phi| - \alpha |\sin \phi + R_c \cos \phi|}{|\cos \phi + R_c \sin \phi|} \qquad (9)$$

$$= 1 - \alpha \left| \frac{\sin \phi + R_c \cos \phi}{\cos \phi + R_c \sin \phi} \right| \quad (10)$$

The improvement ratio $R_I$ is then:

$$R_I = \frac{\Delta S/\Delta J}{|S_h + R_x S_v|/|J_h + R_c J_v|} = \frac{1}{C}\left[1 - \alpha \left|\frac{\sin \phi + R_c \cos \phi}{\cos \phi + R_c \sin \phi}\right|\right] \quad (11)$$

$$R_I = \frac{1}{C}\left[1 - (1-C)\left|\frac{\cos \theta + R_c \sin \theta}{\sin \theta + R_c \cos \theta}\right|\left|\frac{\sin \phi + R_c \cos \phi}{\cos \phi + R_c \sin \phi}\right|\right] \quad (12)$$

(This equation assumes that the variations in $\theta$ are within the response of the AGC circuits and that the AGC circuits have negligible response to the desired signal.) These assumptions are compatible with realizable AGC characteristics and anticipated interfering signal polarization variations. It should be pointed out, however, that due to other simplifying assumptions, the equation yields a reasonable approximation rather than an exact indication of the system capability in interfering signal rejection, considering that the assumption of a fixed cross-coupling characteristic may not be completely valid in practical applications of the system, and other practical variations. Although cross-coupling for signals received at angles off from the antenna boresight axis may be expected to differ from cross-coupling for those on the boresight axis, and in certain antenna configurations, it is possible that the cross-coupling characteristic of one channel may not be identical to that of the other channel, nevertheless these effects will not appreciably decrease the undesired signal restricting capability of the system.

The equation for $R_I$ may appear to mathematically yield fallacious indications of undesirable system performance in certain specialized instances due to inexact expression of the system cancellation capability. For any given interfering signal polarization angle, a received signal of identical polarization will indeed be cancelled by the same ratio as the interfering signal and the improvement ratio will be zero db, however, in practice the desired signal-to-undesired signal phase relationships in the two receiver channels will, as a general rule, differ due to ellipticity of the polarization of the reflected desired signal, change of aspect between source and reception point, and also due to slight frequency differences between the two signals. Since such differential phase relationships exist, the desired signal will be subjected to less effective cancellation than the undesired signal and the improvement ratio will have a positive value at the null. The equation further suggests that there is a signal polarization angle slightly removed from the previous case where the signal will be cancelled completely and the improvement ratio in db would become minus infinity. In practice, complete cancellation of the desired signal will never occur, although, in the absence of the differential phase effect referred to above, a desired signal cancellation somewhat greater than the undesired signal cancellation might be theoretically possible with a resultant negative improvement ratio. Even so, a negative rather than zero value for the improvement ratio minimum would have little practical significance due to the very sharp nature of the null. It is to be generally expected that a decidedly positive minimum will occur in practice, due to the many factors operating, as discussed above, and introducing variations continually.

Figure 2:
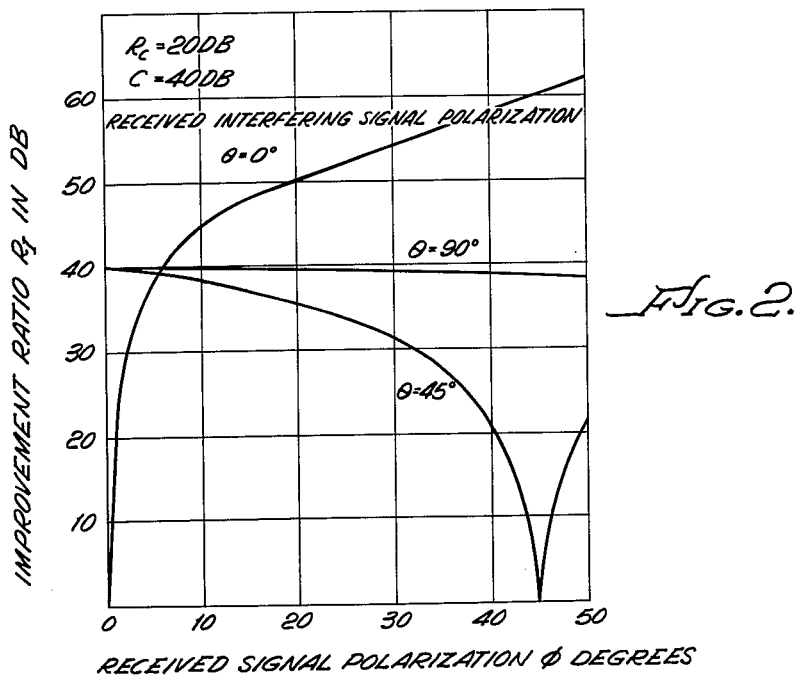
FIG. 2 shows in graphical form the ratio of improvement in the reception of a desired signal during heavy interference when using a typical configuration of the dual polarization receiving system over a system without dual polarization.

The teachings of Equation 12 have been plotted in FIG. 2 with the improvement ratio indicated as a function of $\phi$, the depolarization (angle of polarization difference) of the desired signal for various undesired signal polarizations. Typical realizable values have been assumed for the cancellation ratio (C) and cross-coupling ($R_c$). The current state of the art in MTI (moving target indicator) techniques establishes that the frequency response and time delay of the two channels can be matched to provide a 40 db reduction of the undesired signal.

The range of received signal polarization angles ($\phi$) plotted in FIG. 2 is restricted to 50 degrees in keeping with the maximum depolarization of the received signal which is known to be likely to occur in practical radar applications. Experimental data indicates that the cross-polarized components of target reflections seldom if ever, exceed the directly polarized component, and the effective depolarization of the transmitter signal, therefore, is limited to approximately 50 degrees.

As indicated in FIG. 2, the improvement ratio obtained exceeds 30 db for a polarization difference ($\phi$) between the desired signal return and the undesired signal greater than about two degrees in the region of expected signal polarizations. In considering this information it is thought that the reader should be reminded that since the differencing is performed in this system at the video level, as previously mentioned, elliptically polarized signals are equivalent to some plane of linear polarization, i.e., circularly polarized interfering signals will be cancelled in the same manner as a 45 degree linearly polarized signal. In all instances, where the improvement ratio is less than the system cancellation capability (40 db in the illustrated example), the inability to obtain an improvement ratio of that order is due to some inevitable degradation of the desired signal rather than a lessening of the interfering signal cancellation. Under conditions when the improvement ratio exceeds 40 db, it is due to an actual enhancement of the desired signal output (as compared to the signal that would be obtained by a receiving system not using dual polarization) rather than a change in the interfering signal cancellation. Dual polarization (DP) in accordance with the present invention, therefore, may be thought of as producing of itself an essentially constant interfering signal cancellation with either a degradation or an enhancement of the desired signal as a function of the signal polarization relative to the interfering signal polarization.

Figure 3:
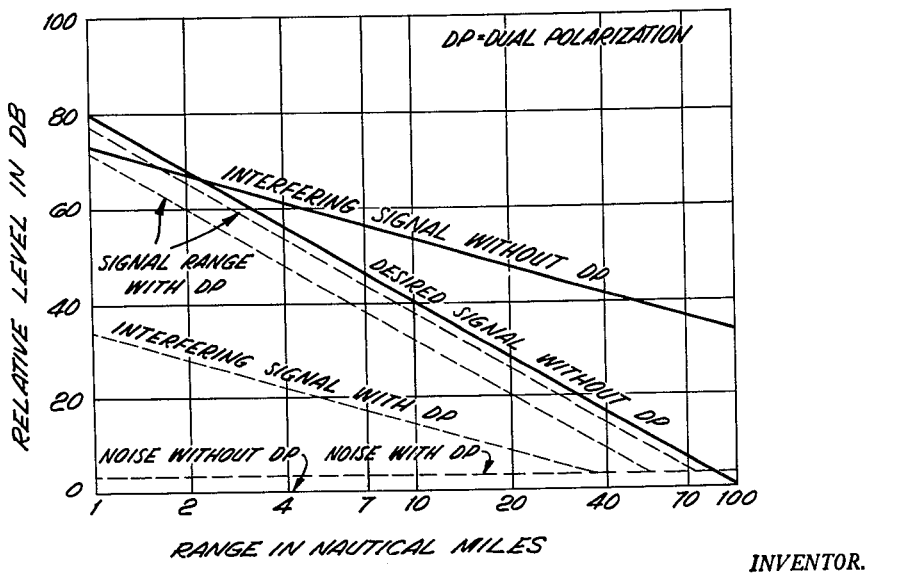
FIG. 3 illustrates experimental dual polarization system performance against 45 degree or circular polarized signal interference.

As an example, in the case of an interfering signal from an aircraft, the effects which dual polarization will produce on the desired radar signal, interfering signal, and noise levels under typical operating conditions are shown in FIG. 3. It is assumed in the illustrated example shown in FIG. 3 that the radar cross-section of the interfering signal from the aircraft and the parameters of the unmodified radar are such that the aircraft can be detected at a range of 100 nautical miles in the absence of the interfering signal is either 45 degree or circularly polarized and is capable of radiating sufficient RF energy to produce a unity J/S ratio at a range of two nautical miles.

If dual polarization in accordance with the present invention were applied to this radar with the cancellation ratio and cross-coupling values as assumed in the previous discussion, the indicated changes would result. The noise level in the output would be increased by 3 db. The interfering signal level would be reduced by 40 db out to a range of approximately 35 nautical miles, beyond which it would be reduced to the noise level. The desired signal would be reduced by a variable amount as a function of the instantaneous depolarization of the radar return. Since the instantaneous depolarization will be principally in the range from 10 to 30 degrees, the signal losses will generally range from 2 to 8 db.

The net effect of the dual polarization system of the present invention under the above conditions would be to completely counter the effectiveness of the interfering signal from the aircraft at the cost of only a small loss in range due to the small signal-to-noise ratio loss (i.e., noise level increase and the desired signal reduction). The results would be similar for any lesser interfering signal level than assumed in the foregoing. Interference levels higher than those which have been assumed here would seem highly unlikely, but even if the power of the interfering signal were increased by a factor of four, the same range would still be obtainable, the new limitation being interference received power level instead of a signal-to-noise degradation.

Figure 4:
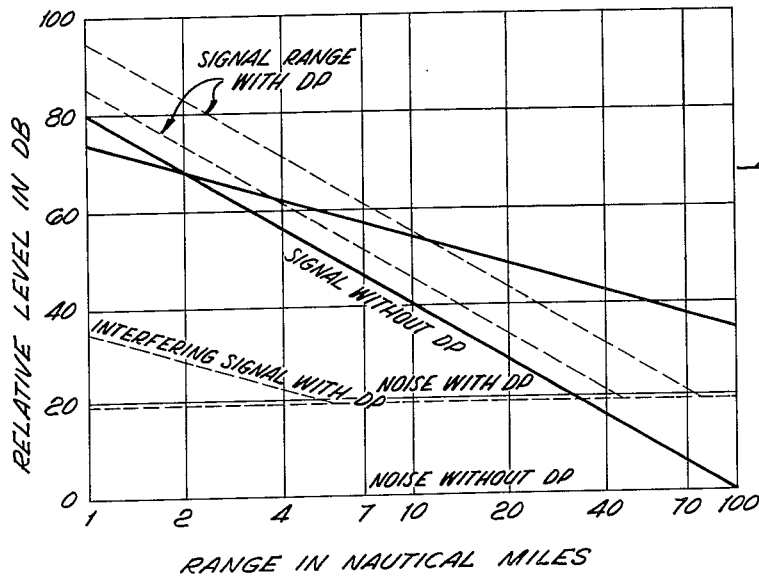
FIG. 4 shows the dual polarization performance against direct linearly polarized signal interference.
Figure 5:
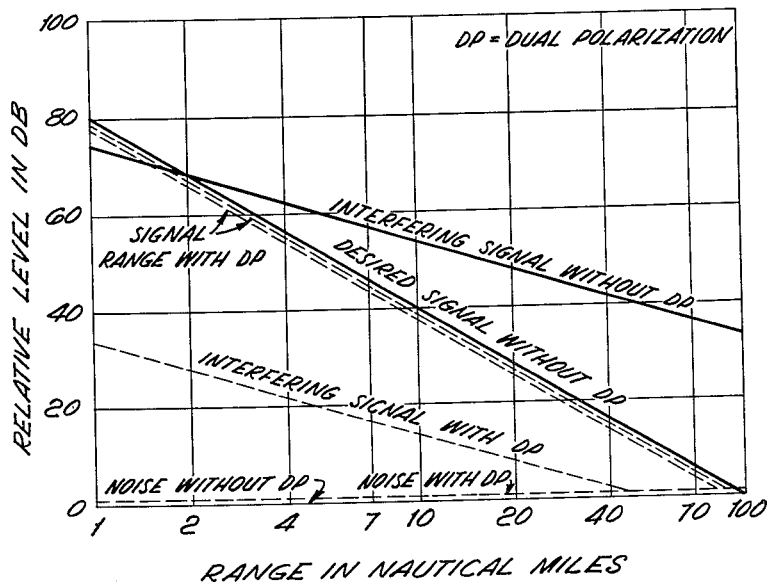
FIG. 5 shows the dual polarization performance against cross polarized signal interference.

While 45 degree or circularly polarized interference may be most likely to be encountered in the case of an aircraft or ground station transmitting international RF interference, other polarizations must also be considered. FIGS. 4 and 5 indicate the performance of the dual polarization system of the present invention against interfering signals which are, respectively, directly polarized and cross-polarized with respect to the desired signal polarization. Except for the polarization of the interfering signal, all of the conditions assumed here are the same as for the previous example. In the directly polarized case, the interfering signal level would again be reduced to 40 db out to ranges where cancellation is limited by the noise level. The noise level increase would be appreciably greater than in the previous case discussion (approximately 20 db instead of 3 db), but this effect is partially counteracted by a desired signal enhancement on the order of 5 to 15 db which also occurs. The interfering signal is again completely countered at the cost of a slightly greater net loss in range than in the case of the 45 degree signal interference. The most effective performance of dual polarization is obtained under cross-polarized conditions, shown in FIG. 5. The full 40 db reduction in the interfering signal level is obtained with a nearly negligible increase in noise level and very little desired signal degradation.

From the foregoing it will be obvious to those skilled in the art that dual polarization is basically applicable to various surveillance and tracking radars. One channel, if desired, can essentially be the "normal" radar channel (such as in FIG. 6 the channel through 612 to detector 624, which has no AGC), and when dual polarization is not required, can be operated singly to provide "normal" video. Extremely simple switching which would bias off IF amplifier 619 and divert the output of detector 624 to the system output directly would suffice, but of course, alternative switching arrangements would suggest themselves to those skilled in the art upon exercise of ordinary electronic engineering skill.

The band-pass and delay-time matching of the two channels is no more difficult than that encountered in a conventional coherent MTI (moving target indicator) canceller. Note that, addition of a second channel (to an ordinary radar system to accommodate the present invention) will not require an additional duplexer, however, an additional TR tube is shown for mixer crystal protection. The mixers and pre-amplifiers for the two channels are identical and employ a common local oscillator to ensure that both channels are tuned to the same frequency. Manual gain control or predetermined STC (sensitivity time control), if employed, should be applied equally to both channels.

The detailed circuit design of the AGC if employed for surveillance radar applications is relatively straight-forward. An averaging or integrating type AGC is employed to provide AGC action substantially only in response to high-duty cycle signals. Ideally, the AGC response should follow polarization fluctuations of the interfering signal and shifts caused by the differing polarization sensitivities of the side and back lobes of the scanning radar antenna, but should be too slow to produce a gain change in response to the target pulse. The specific AGC characteristic is necessarily tailored to the particular radar involved, as well as to the conditions encountered.

In many tracking radar applications, the only signals which are utilized for tracking are those which occur within a range gate. In such a system, the differentiation between desired and undesired signals could be accomplished by utilizing the relative rate of polarization variation of these signals during the range gated interval rather than the duty cycle difference which is suggested for utilization with surveillance radar applications. However, since range gating is performed at the video level in the vast majority of tracking radars, there is no reason why dual polarization cancellation utilizing duty cycle difference cannot be performed on the continuous signals with range-gating applied at the output (as of 110 in FIG. 1).

In FIG. 1, gain control signals are shown applied to both IF amplifiers 106 and 107, the gain control being differentially applied so that while one is increasing, the other is decreasing. Although it will be noted from the more detailed system block diagram of FIG. 6 that only one of the two channels is gain controlled, it may under some circumstances be desirable to gain control both channels differentially as in FIG. 1. In using differential control, each channel may be controlled over half the gain range over which one controlled channel would have to be controlled, all other conditions being equal.

Referring now to FIG. 6, a more detailed and complete arrangement including one channel AGC, transmitting components, and other refinements is illustrated. Assume that horn antenna 601 is horizontally polarized and horn antenna 602 is vertically polarized. Switch 604, manually or electrically operated, is used to select antenna horn 601 or 602 for radiation of the RF energy of transmitter 606. Thus, by the use of switch 604, the radiated energy can be either horizontally or vertically polarized, depending on the position of said switch 604. Therefore, if the desired signal, i.e., the reflected transmitted signal, has a polarization closer than 45 degrees to that of the interfering signal, it is possible to change the polarization of the incident wave by switching from the one antenna feed to the other by use of switch 604. In this manner it is possible to maintain at least the required minimum polarization difference between the transmitted signal the interfering signal.

Radiation polarization controlled antennas could be used in such a system, i.e., an antenna system especially adapted for producing or receiving radiation of any arbitrarily selected type of polarization. Thus, an antenna that is normally responsive only to the radiation component that is linearily polarized in a definite plane may be made responsive with substantially normal efficiency to radiation having any selected polarization characteristics.

Such a system controlling the polarization of an antenna is useful in conjunction with a system using the present invention, and is delineated in considerable detail in patent application Serial No. 539,049, filed October 7, 1955, now U.S. Patent No. 2,930,040.

The horizontal receiving channel or the vertical receiving channel, depending on the position of switch 604, is connected directly to a common transmission line, thus the receiver is susceptible to damage by the high power transmitted pulses, and also the transmitter may absorb too much of the returned echo power between transmitted pulses. Therefore, as in most radar systems, some fast acting switching means is required to effectively disconnect the receiver from the common transmission line during transmission of RF energy of the transmitter 606, and also serve to isolate the transmitter 606 from said common transmission line during receive intervals. The duplexer 607 is such a device. Duplexer 607 is also referred to by those skilled in the art as a TR (transmit-receive) device. The TR device 609 in the vertical channel performs a similar duty in the vertical channel to that performed by the TR 627 in duplexer 607 in the horizontal channel.

Detailed information on the subject of TR devices will not be taken up in this specification, inasmuch as the TR device and its application is essentially prior art. The art concerning TR (transmit-receive) devices is delineated in detail in chapter XI of "Principles of Radar" by M.I.T. Radar School Staff, a McGraw-Hill Book Company publication (1946), as well as in many other standard text books.

Returning briefly to the antenna system, horn antennas 601 and 602 could be made to function in accordance with the said patent application, Serial No. 539,049, or could be simply separate fixed polarized antenna horns with or without separated reflectors. In this manner, the radiated incident energy could be either vertically or horizontally polarized automatically as described in the said patent application. Thus, if the interfering signal is predominately horizontally polarized incident energy and at the same time horn antenna 602 is made to be responsive only to horizontally polarized incident energy. The radiated energy from transmitter 606 via horn antenna 601 would then be vertically polarized. The horn antennas 601 and 602 can, of course, be made to operate in conjunction with a single parabolic reflector such as is suggested in FIG. 6 by reflector 603. If such an arrangement is incorporated it will be seen then that the selectibility of transmitted energy polarization added through use of the device of patent application Serial No. 539,049 introduces a refinement which obviates waveguide switch 604.

During the receiving intervals, the horizontally polarized incident waves are impressed upon dual crystal mixer 611 and the vertically polarized incident waves are impressed on dual crystal mixer 613. The output of the local oscillator 614 is equally divided by the magic T junction 615 and is injected into both crystal mixers through the magic T junctions 610 and 612 of the horizontal and vertical channels respectively. Attenuator 623 is an adjustable waveguide attenuator used to set the local oscillator power level input to the crystal mixers.

Inasmuch as the above mentioned magic T (as in the case with TR devices) is of the prior art, no detailed description on that subject will be undertaken in the specification. If desired, the entire subject of branched duplexers and balanced duplexers and the related magic T and their application can be reviewed by reference to "Microwave Duplexers" by Smullin and Montgomery, volume 14 of the Radiation Laboratory Series, published by McGraw-Hill Book Co., New York. Chapter 8 of said reference discusses the subject of the magic T in considerable detail, and other techniques for applying the many species of branched duplexers will be suggested by this reference and other microwave component publications.

The output signal from the dual crystal mixer 611 is impressed upon the horizontal IF pre-amplifier 618 and is then sent to the horizontal IF amplifier 619. At the same instant the output signal from the dual crystal mixer 613 is also impressed upon the vertical IF pre-amplifier 616 and is then sent to the vertical IF amplifier 617. The output signals of the two IF amplifiers 617 and 619 are then detected by their respective detectors 624 and 620. Up to this point the units comprising each channel should be interchangeable, i.e., the signal delay through each of the two channels up to the detected output should be as nearly equal as possible. Thus, with duplicate mixers, IF amplifiers and detectors equal signal delay at the output of detectors 624 and 620 is realized. The said output of each of the said detectors is then fed to subtraction network 625. The difference signal from the subtraction network is then fed to amplifier-rectifier 622, the output of which becomes the system signal. This same difference signal from the subtraction network 625 is also fed back to the AGC amplifier which in turn controls the gain of IF amplifier 619. The AGC action is such that the amplitude of the output of the IF amplifier under control is always equal to the output of the IF amplifier in the other channel, i.e., the output of the subtraction network 625 is zero. Of course, the said zero output of the subtraction network 625 is not obtained for all instantaneous values of video signal, but rather a finite integrating or averaging time is required so that the reduction or increase in gain of IF amplifier 619 does not take place rapidly enough to have the effect of cancelling out desired signals. This time required for an increase or decrease of gain of the said IF amplifier 619 is dependent on the circuit constants of the AGC amplifier 626. The relation of the time constants of the AGC circuit to the characteristics of the system as a whole has already been generally pointed out. In the case of intentional interference from a CW modulated or unmodulated signal, the time constants of the AGC circuit would be such that the gain of the channel being controlled, in this case IF amplifier 619, is not appreciably affected by a single pulse, but is increased or decreased by long blocks of signals or by modulated or unmodulated CW signals. In such an AGC system, the resultant output of the subtraction network 625, in respect to the high duty signals (i.e., the CW interfering signals) would be zero. The lower duty cycle returned transmitted pulse has substantially no effect on the AGC circuits and, therefore, on effect on the gain of IF amplifier 619. Accordingly, the signals at the output of the IF amplifiers 619 and 617 differ instantaneously during the passage of the relatively low duty cycle received pulse, and the subtraction network 625 demanding equal inputs for cancellation of the received signal will not cancel the desired signal input during the low duty cycle pulse period, specifically because of the AGC time constant. The net signal difference from 625, therefore, contains the desired signal which is accepted by the input of the amplifier rectifier 622, the output of which is then sent to an indicating system or other utilization device.

As pointed out previously, the speed of response or frequency response of the gain control circuitry is made sufficient to allow the relative gain to be properly adjusted to "follow" and thus maintain cancellation as the antenna beam moves relative to the interference source, thus providing cancellation on the side and back lobes as well as on the antenna main lobe.

Since it will be obvious to those skilled in the art that the circuitry of the individual block components comprising the dual polarization system of reception is dependent upon the particular application of such a system, no detailed circuit showing being considered necessary herein. The detailed circuitry is clearly within the capability of the technician in this art, with the assistance of the various published engineering material cited herein, once the novel system concepts of the present invention are understood.

Suitable circuitry for the various block components of FIG. 6 insofar as they are conventional can be found in Radar Systems Engineering by Ridenour, volume 1 of the Radiation Laboratory Series, published by McGraw-Hill Book Co., New York (particularly to chapter 12).

With the above explanation completed, the following additional description is intended to explain the capability of the system of the present invention for discriminating against hydrometeoric return. At least two techniques are currently employed to achieve rejection or discrimination against such return from rain and other precipitation.

Circularly polarized radar systems have been employed recently because of their ability to discriminate against signal return from hydrometeoric phenomena. These prior art systems usually differ from conventional radar systems only in antenna configuration for radiation and reception of circular polarized energy. Such systems invariably suffer a loss in target signal level as compared to a linearly polarized radar, and the difficulty in obtaining true circularization over the antenna beam also somewhat limits their rain rejection capability. Simple cross-polarized radar operations for rain return rejection, i.e., transmitting with a given linear polarization and receiving orthogonally, makes inevitable a much greater loss in target signal.

Dual polarization, according to the present invention, can provide a greater rain rejection than either of these prior art systems, and wherever the present invention is required for its anti-jamming capability, the rejection of reflections from hydrometeoric phenomena are obtained as an additional benefit.

Considering now the operation of the DP (dual polarization system according to the present invention) as regards rejection of return from rain and other hydrometeoric phenomena, assume for the moment that rain and to similar extent snow and hail have a uniform characteristic (not localized, and of constant intensity). Such undesired return would appear to the averaging AGC action essentially the same as CW interference, at a polarization angle nearly the same as the transmitted polarization. With typical average de-polarization of the typical aircraft target signal (reflected) of from 10 to 30 degrees, theoretical improvement ratios of 40 to 50 db are obtained. Although the usable improvement will be somewhat less than this because of increased receiver noise at the receiver output; however, the improvement ratio can be expected to be better than achieved through prior art "rain clutter" discriminating means. The fact that rain in actuality will tend to be non-uniform over the area will simply result in non-continuous rain return at the receiver. The rain clutter, therefore, constitutes an intermittent interference source with some amplitude variation, but essentially fixed polarization. The system of the present invention, which thereby detects the presence of average return from rain to establish dual polarization operation, may also be used on "normal" (single) channel reception at other times, as discussed in connection with use of the system against CW jamming.

In view of the discussion and explanation heretofore presented, it will be appreciated that the illustration of a specific embodiment of the invention, as shown and described, is by no means intended to be a definition of the limits of the invention or the inventive concept, since many changes and modifications falling within the spirit and scope of the present invention will suggest themselves to those skilled in the art.

Accordingly, what is claimed is:

1. A system for discriminating between desired and undesired signals of approximately the same frequency but having different duty cycle comprising the combination of: antenna means adapted to receive radiant energy in first and second angularly separated planes of polarization and to supply first and second antenna outputs corresponding respectively to radiant energy thereby received in said first and second planes of polarization; first and second receiver means connected to said first and second antenna outputs respectively to produce first and second demodulated signals corresponding respectively to said first and second antenna outputs; differencing means responsive to said first and second demodulated signals for developing at least one control signal as a function of the difference in amplitude between said first and second demodulated signals; and means for applying at least said one control signal to one of said receiver means, thereby controlling the gain of at least one of said receiving means in sense tending to produce equality of said demodulated signals.

2. A system operative in a frequency band for discriminating between a desired signal having a predetermined duty cycle and an undesired signal having a substantially higher duty cycle, comprising: antenna means for receiving both said desired and undesired signal, said antenna means being adapted to separate said signals into first and second signal components corresponding to energy in first and second polarization planes respectively; first and second receiving means connected to receive said first and second components respectively, at least one of said receiving means being responsive to gain control signals; comparison means connected to accept the outputs of said first and second receiving means, and to generate said gain control signals as a function of the difference in magnitude of the outputs of said first and second receiving means; and means to apply said gain control signals to at least one of said first and second receiving means in a sense so as to tend to equalize the said outputs of said first and second receiving means.

3. The invention set forth in claim 2 further defined in that said first and second polarization planes are constrained to be mutually substantially perpendicular by the nature of said antenna means.

4. The invention set forth in claim 2 further defined in that said antenna means includes polarization sensitive means for separating energy in first and second orthogonal planes of polarization from desired and undesired signals simultaneously and thereby producing said first and second components corresponding respectively to said first and second planes of polarization in space.

5. The invention set forth in claim 2 in which any of said receiving means adapted to be gain controlled is of the superheterodyne type including a local oscillator, mixer, and an intermediate frequency amplifier of at least one stage, and said gain control signals are applied to at least one stage of said intermediate frequency amplifier.

6. A system for discriminating between desired signals and undesired signals in a frequency band, said desired signals having a substantially lower duty cycle than said undesired signals, comprising: antenna means having first and second antenna outputs and being adapted to separate incident electromagnetic energy on the basis of polarization, whereby that portion of said incident electromagnetic energy in a first plane of polarization is directed to said first antenna output and that portion of said incident electromagnetic energy in a second plane of polarization is directed to said second antenna output; receiving means having separate first and second receiving channels, connected respectively to said first and second antenna outputs said receiving channels being independently gain controllable; comparison means connected to both of said receiving channels for comparing the signal outputs of said receiving channels and generating first and second gain control signals of opposite sense and having magnitudes which are a function of the difference in magnitude of the said signal outputs of said receiving channels; and means applying said gain control signals to said first and second signal channels whereby said receiving channels are controlled differentially, thereby tending to equalize said signal outputs of said receiving channels.

7. A system for discriminating between desired signals and undesired signals in a frequency band, said desired signals having a substantially lower duty cycle than said undesired signals, comprising: antenna means having first and second antenna outputs and being adapted to separate incident electromagnetic energy on the basis of polarization, whereby that portion of said incident electromagnetic energy in a first plane of polarization is directed to said first antenna output and that portion of said incident electromagnetic energy in a second plane of polarization is directed to said second antenna output; receiving means having first and second receiving channels connected respectively to said first and second antenna outputs, said receiving channels being independently gain controllable; comparison means connected to both of said receiving channels for comparing the signal outputs of said receiving channels and generating a gain control signal having a magnitude which is a function of the difference in magnitude of the said signal outputs of said first and second receiving channels; and means applying said gain control signal to said first signal channel whereby said first receiving channel is controlled in a sense tending to equalize said signal outputs of said first and second receiving channels.

8. In a radar system operative in a predetermined frequency band which includes pulsed energy transmitting means, an antenna system having first and second antenna channels respectively responsive to electromagnetic energy in a first and second orthogonal planes of polarization in space, and a receiving complex having first and second independent receiver channels at least one of which is gain controllable in response to a gain control signal, the combination comprising: means associated with said antenna system whereby pulses of energy from said transmitting means are directed to said first antenna channel for radiation of said pulses; means for directing energy received by said first and second antenna channels, at times other than during the times of occurrence of said pulses of energy to be transmitted, to said first and second independent receiver channels respectively; means connected to said receiver channels for comparing signal levels present at the output of said receiver channels to derive a useful output signal as a function of the difference between said outputs of said receiver channels; means responsive to said useful output signal to generate a gain control signal as a function of the time integral of the amplitude of said useful output signal; and means applying said gain control signal to said one of said receiver channels which is gain controllable.

9. The invention set forth in claim 8 in which said means responsive to said useful output signal to generate a gain control signal is further defined as including means adapted to average said useful output to generate said control signal, said averaging further defined as having an operating time constant so as to permit automatic variation of said control signal at a rate which is rapid compared to a normal radar antenna mechanical angular space scanning rate but slow compared to the rate of repetition of said pulses of energy from said transmitting means.

10. The invention set forth in claim 8 in which said means responsive to said useful output signal to generate a gain control signal is further defined as including means adapted to average said useful output to generate said control signal, said averaging further defined as including an averaging time constant so as to permit automatic variation of said control signal at a rate which is slow compared to the rate of repetition of said pulses of energy from said transmitting means.

11. In a radar system adapted for discrimination against signal reflections from hydrometeoric phenomena and including a pulsed transmitter, an antenna system having first and second antenna channels respectively responsive to electromagnetic energy in first and second orthogonal planes of polarization, and receiving complex having first and second receiving channels with at least said first receiving channel having at least one gain controllable element adapted to control said receiving channel gain in response to a gain control signal, the combination comprising: means responsive to pulsed electromagnetic energy from said pulsed transmitter for directing said pulsed electromagnetic energy substantially only from said transmitter through one of said antenna channels for radiation into space in substantially the plane of polarization to which said one of said antenna channels is responsive; means, operative at times other than during transmission of said electromagnetic energy, for supplying energy received through said first antenna channel to said first receiver channel and energy received through said second antenna channel to said second receiver channel; means for detecting the outputs of said first and second receiver channels thereby producing corresponding first and second detected signals; differencing means for deriving the algebraic difference signal between said first and second detected signals, said difference signal being the useful output signal; gain control means adapted to integrate said algebraic difference in combination with a predetermined weighting parameter to derive a gain control signal; and means for applying said gain control signal to at least one of said receiver channels, thereby tending to reduce said differencing signal to zero.

12. The combination set forth in claim 11 in which the adaptation of gain control means to integrate said difference signal is substantially in accordance with an averaging process.

13. The combination set forth in claim 11 in which the one of said receiver channels to which said control signal is applied is the same receiver channel as corresponds to the antenna channel through which said pulsed electromagnetic energy from said transmitter passes.

14. In a pulsed radar transmitting and receiving system which automatically adjusts the susceptibility of the receiving function to discriminate on the basis of signal polarization between desired and undesired signals, the combination comprising: an antenna system including a first element responsive to received electromagnetic energy in a first plane of signal polarization and a second element responsive to received electromagnetic energy in a second plane of signal polarization substantially at a ninety degree angle with respect to said first plane and means for providing first and second antenna system outputs respresentative of said first and second planes of polarization respectively; first and second superheterodyne receivers connected to receive signals from said first and second antenna system outputs respectively, each of said receivers providing a video signal output and each having intermediate frequency amplifiers responsive to variable gain control signals; means responsive to both of said video signal outputs for averaging and comparing said video signal outputs and for generating and respectively applying to said first and second receiver intermediate frequency amplifiers first and second variable gain control signals, said first gain control signal being of sense such as to increase in magnitude and said second one of said gain control signals being such as to decrease in magnitude when the signal from said first antenna system output increasees with respect to the signal from said second antenna system output.

15. In a pulsed radar transmitting and receiving system which automatically adjusts the susceptibility of the receiving function to discriminate on the basis of signal polarization between desired and undesired signals, the combination comprising: an antenna system including a first element responsive to received electromagnetic energy in a first plane of signal polarization and a second element responsive to received electromagnetic energy in a second plane of signal polarization substantially at a ninety degree angle with respect to said first plane and means for providing first and second antenna system outputs representative of said first and second planes of polarization respectively; first and second superheterodyne receivers connected to receive signals from said first and second antenna system outputs respectively, each of said receivers having an intermediate frequency amplifier and each providing a video signal output, said first receiver having its intermediate frequency amplifier responsive to variable gain control signals; means responsive to both of said video signal outputs for averaging and comparing said video signal outputs and for generating and respectively applying to said first intermediate frequency amplifier said variable gain control signals, said gain control signal being of sense such as to increase in magnitude when the signal from said first antenna system output increases with respect to the signal from said second antenna system output.

References Cited in the file of this patent

UNITED STATES PATENTS

| 2,533,599 | Marie | Dec. 12, 1950 |
| 2,658,991 | O'Brien et al. | Nov. 10, 1953 |

FOREIGN PATENTS

| 750,600 | Great Britain | June 20, 1956 |